(12) United States Patent
Lee et al.

(10) Patent No.: US 10,997,161 B2
(45) Date of Patent: *May 4, 2021

(54) ENSURING SNAPSHOT MONOTONICITY IN ASYNCHRONOUS DATA REPLICATION

(71) Applicant: SAP SE, Walldorf (DE)

(72) Inventors: Juchang Lee, Seoul (KR); Chang Gyoo Park, Seoul (KR); Hyejeong Lee, Seoul (KR)

(73) Assignee: SAP SE, Walldorf (DE)

( * ) Notice: Subject to any disclaimer, the term of this patent is extended or adjusted under 35 U.S.C. 154(b) by 88 days.

This patent is subject to a terminal disclaimer.

(21) Appl. No.: 16/386,776

(22) Filed: Apr. 17, 2019

(65) Prior Publication Data

US 2019/0243823 A1 Aug. 8, 2019

Related U.S. Application Data

(63) Continuation of application No. 14/945,296, filed on Nov. 18, 2015, now Pat. No. 10,303,679.

(60) Provisional application No. 62/175,978, filed on Jun. 15, 2015.

(51) Int. Cl.
| | | |
|---|---|---|
| *G06F 16/00* | (2019.01) | |
| *G06F 16/23* | (2019.01) | |
| *G06F 11/14* | (2006.01) | |
| *G06F 16/27* | (2019.01) | |
| *G06F 16/2455* | (2019.01) | |
| *G06F 11/00* | (2006.01) | |

(52) U.S. Cl.
CPC .......... *G06F 16/2379* (2019.01); *G06F 11/00* (2013.01); *G06F 11/14* (2013.01); *G06F 11/1474* (2013.01); *G06F 16/2455* (2019.01); *G06F 16/273* (2019.01); *G06F 2201/80* (2013.01)

(58) Field of Classification Search
CPC .............. G06F 16/2379; G06F 16/273; G06F 16/2455; G06F 11/00; G06F 11/14; G06F 11/1474; G06F 2201/80
See application file for complete search history.

(56) References Cited

U.S. PATENT DOCUMENTS

| | | | | |
|---|---|---|---|---|
| 7,111,189 B1* | 9/2006 | Sicola | .................. | G06F 11/2092 714/15 |
| 2002/0194015 A1* | 12/2002 | Gordon | .................. | G06F 16/273 705/1.1 |
| 2005/0210010 A1* | 9/2005 | Larson | ................ | G06F 16/2457 |
| 2009/0157766 A1* | 6/2009 | Shen | .................... | G06F 11/2041 |
| 2009/0313311 A1* | 12/2009 | Hoffmann | ........... | G06F 11/2097 |
| 2010/0191884 A1* | 7/2010 | Holenstein | .......... | G06F 11/2094 710/200 |
| 2013/0198133 A1* | 8/2013 | Lee | ......................... | G06F 16/00 707/611 |

(Continued)

OTHER PUBLICATIONS

Normann et al., "A Theoretical Study of 'Snapshot Isolation'", 6 pages (Mar. 2010).

*Primary Examiner* — Jared M Bibbee

(74) *Attorney, Agent, or Firm* — Klarquist Sparkman, LLP

(57) ABSTRACT

Technologies are provided for reducing or eliminating transaction consistency anomalies that can occur during data replication, such as during database table replication. For example, commit values can be used to coordinate requests so that the requests are not performed on database tables with inconsistent data.

20 Claims, 11 Drawing Sheets

(56) References Cited

U.S. PATENT DOCUMENTS

| | | | |
|---|---|---|---|
| 2013/0238556 A1* | 9/2013 | Mielenhausen | G06F 16/27 707/624 |
| 2015/0278329 A1* | 10/2015 | Hrle | G06F 16/27 707/615 |
| 2019/0236179 A1* | 8/2019 | Priebe | G06F 16/2358 |

* cited by examiner

ENSURING SNAPSHOT MONOTONICITY IN ASYNCHRONOUS DATA REPLICATION

CROSS REFERENCE TO RELATED APPLICATIONS

This is a Continuation of U.S. patent application Ser. No. 14/945,296, filed Nov. 18, 2015, which claims the benefit of U.S. Provisional Patent Application No. 62/175,978, filed Jun. 15, 2015, both of which are hereby incorporated by reference in their entirety.

BACKGROUND

A database management system (DBMS) may provide for replicating database data among a number of database nodes. For example, replicating database data can improve the performance of the database system. However, replication of database data can lead to different versions of the data being stored at different locations within the database system.

Therefore, there exists ample opportunity for improvement in technologies related to data replication in a DBMS.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are provided herein for reducing or eliminating transaction consistency anomalies that can occur during data replication across database nodes, such as during asynchronous database table replication. For example, commit values can be used to coordinate requests transmitted to different database nodes so that the requests are not performed on database tables with inconsistent data.

In some implementations, a commit value is obtained in response to a first request during a session. If a subsequent request during the session would utilize a replicated database table with a commit value less than the commit value associated with the first request, then the subsequent request is delayed (e.g., until the replicated database table is updated).

As described herein, a variety of other features and advantages can be incorporated into the technologies as desired.

DETAILED DESCRIPTION

Example 1—Overview

The following description is directed to technologies for reducing or eliminating transaction consistency anomalies that can occur during data replication, such as database replication. For example, the technologies can be applied to database table replication, including asynchronous database table replication.

Some solutions that apply asynchronous data replication offer performance improvement by offloading query and/or data request workloads from source database nodes to replica database nodes that contain replicas of all or part of the data stored in the source database nodes. Then, the existing source database nodes can focus on data manipulation, write operation, and/or transaction processing workloads without becoming overburdened with queries and/or requests for data.

However, in some solutions, transaction consistency anomalies can arise in asynchronous data replication usage scenarios. Described herein are various technologies that can be applied to reduce or eliminate data consistency anomalies that arise during asynchronous data replication.

In some scenarios, a database client can send a first request to a source database node and a second, subsequent request to a replica database node. A data consistency anomaly can result if the data stored in the source database node and the data stored in the replica database node are not in a consistent state. The technologies described herein can be used to ensure that the replica database node's data is in a state consistent with the state of the source database node's data before the replica database node processes the second request.

As used herein, the phrase "ensuring snapshot monotonicity" means ensuring that a database node's data is in a state such that the database node can process a request from a database client without risking the creation of a data consistency anomaly. In some embodiments, the state of a database node's data refers to a snapshot, version, or commit state of the data. For instance, in some solutions where data is replicated asynchronously, a source database node and a replica database node may have different snapshots, versions, or commit states of the same data, after data in the source database node has been updated but before the updated data has been asynchronously replicated in the replica database node. The technologies described herein can be used to avoid data consistency anomalies in such scenarios.

Example 2—Systems for Ensuring Snapshot Monotonicity in Asynchronous Data Replication In any of the examples herein, a server environment can be provided for performing operations for ensuring snapshot monotonicity.

Figure 1:
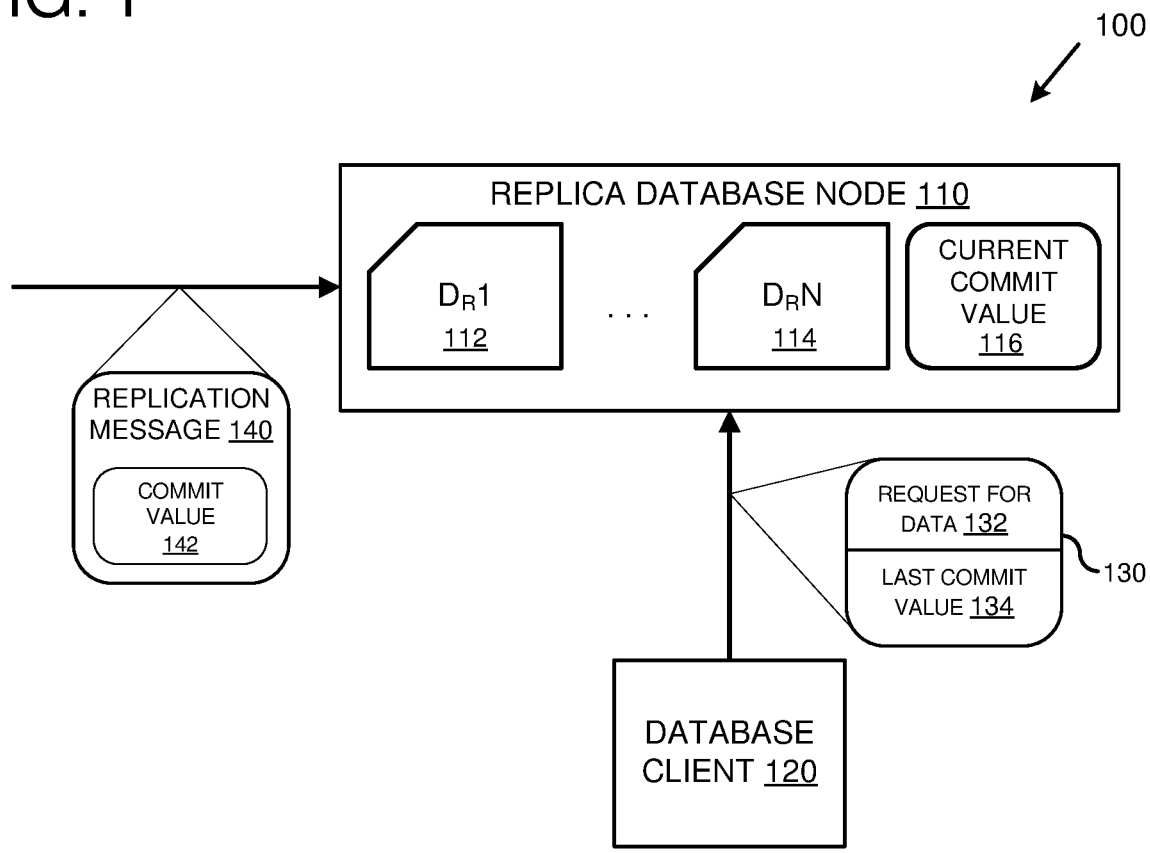
FIG. 1 is a diagram depicting an example system for ensuring snapshot monotonicity in asynchronous data replication.

FIG. 1 is a diagram depicting an example system 100 for ensuring snapshot monotonicity in asynchronous data replication to replica database nodes (RDNs) (e.g. 110). In this example, RDN 110 comprises a current commit value 116 and one or more replica data items (e.g. $D_R1$ 112-$D_R N$ 114).

A data item can be any identifiable piece of data such as a value, object, database record, document, entity, etc. Some or all of the data items can be stored in one or more collections, database tables, or the like. A replica data item is a data item that is a duplicate or copy of another data item. However, in some embodiments, a data item can be modified independently of an associated replica data item. In such an embodiment, the modified data item and the unmodified replica data item can represent different versions, snapshots, or commit states of the data item.

Last commit value 134 and current commit value 116 are values such that it is possible to compare them to each other and determine if one of them is greater than the other or if they are equal. For instance, last commit value 134 and current commit value 116 can be numbers, such as integers, timestamps, or any other types of values that can be incremented and compared.

In some embodiments, last commit value 134 identifies a commit state, snapshot, or version of one or more data items. In such an embodiment, current commit value 116 identifies a commit state, snapshot, or version of one or more of the data items stored in replica data items 112-114. When current commit value 116 is less than last commit value 134, it indicates that the commit state, snapshot, or version of the data items stored in replica data items 112-114 is not current enough to process query 130.

RDN 110 is configured to receive queries, such as example query 130, from database clients (e.g. 120). Example query 130 comprises at least one request for data 132 and a last commit value 134. RDN 110 is also configured to process query 130. For instance, processing query 130 can comprise identifying one or more of replica data items 112-114 that satisfy request for data 132 and returning the identified data item(s) to database client 120. RDN 110 is also configured to compare current commit value 116 to last commit value 134 and to process query 130 only if last commit value 116 is greater than or equal to last commit value 134.

RDN 110 is also configured to receive replication messages (e.g. replication message 140). In some embodiments, RDN 110 is configured to receive replication messages asynchronously. For instance, in some embodiments RDN 110 can receive replication message 140 after receiving query 130, but can begin processing replication message 140 before processing query 130 or while processing query 130. RDN 110 is configured to process replication message 140. Replication message 140 comprises a commit value 142 and, if commit value 142 is greater than current commit value 116, processing replication message 140 also comprises updating current commit value 116 to a value equal to commit value 142.

In embodiments where current commit value 116 represents a current commit state, snapshot, or version of data stored as replica data items 112-114, processing replication message 140 can comprise updating or altering data items 112-114 to a new commit state, version, or snapshot of the data. In these or further embodiments, commit value 142 identifies the new commit state, version, or snapshot of the data, and updating current commit value 116 to the value of commit value 142 indicates that the new commit state, version, or snapshot of the data is now stored in replica data items 112-114.

In embodiments where replication message 140 is received asynchronously, processing replication message 140 may allow RDN to process a query that could not be processed previously. For instance, before processing replica message 140, current commit value 116 may have been too small for RDN 110 to process query 130. However, after processing replication message 140, and thereby increasing current commit value 116, current commit value 116 may be large enough to process query 130.

In some embodiments, RDN 110 is a server with independent hardware components. In such an embodiment, RDN 110 communicates via network connections, such as wired connections (e.g. Ethernet cables or fiber optic cables) or wireless connections (such as radio-based connections like Wi-Fi).

In other or further embodiments, RDN 110 can be a socket in a non-uniform memory access (NUMA) architecture. In such an embodiment, RDN 110 can communicate via network connections, direct access to remote memory (e.g., Intel® QuickPath Interconnect, AMD HyperTransport™, or the like), indirect access to remote memory (e.g., front-side bus, network interface, or the like), or any combination thereof.

RDN 110 can also be implemented as part of a uniform memory access (UMA) architecture or as virtual servers in a virtual server environment that supports hardware emulation.

Database client 120 can be a computing device capable of communication via wired or wireless transmissions, such as a server, personal computer, laptop, hand-held computing device, wearable computing device, or the like.

Figure 2:
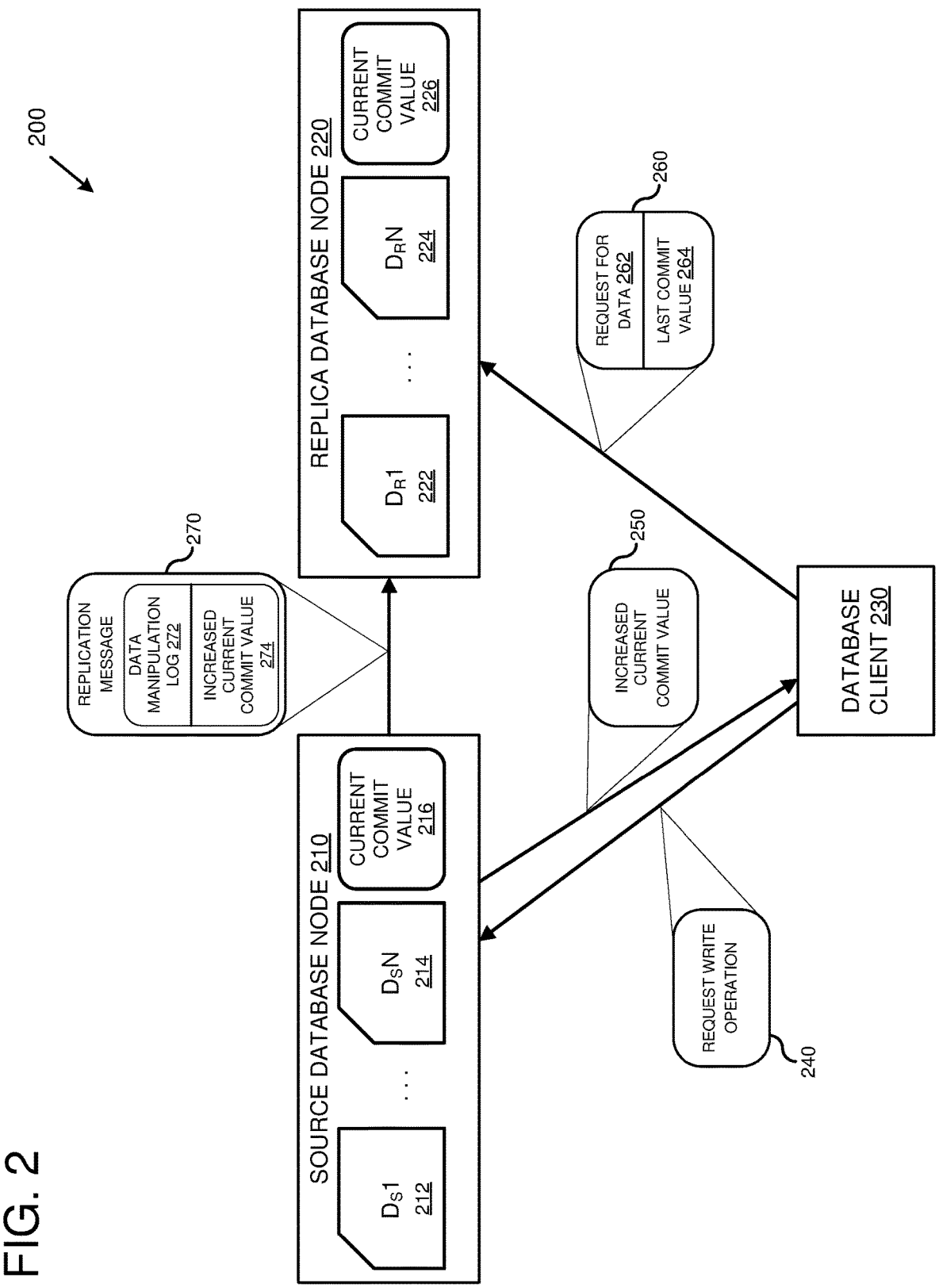
FIG. 2 is a diagram depicting another example system for ensuring snapshot monotonicity in asynchronous data replication, wherein a replication message is transmitted to a replica database node from a source database node.

FIG. 2 is a diagram depicting another example system 200 for ensuring snapshot monotonicity in asynchronous data replication to replica database nodes (RDNs, e.g. 220). System 200 comprises a source database node (SDN) 210, a RDN 220, and a database client 230.

SDN 210 comprises one or more source data items (e.g. $D_S1$ 212-$D_S N$ 214) and a current commit value 216 associated with the source data items. For instance, in some embodiments current commit value 216 represents a current commit state, version, or snapshot of data stored in source data items 212-214. SDN 210 is configured to receive and process requests to perform write operations (e.g. request 240) from database client 230.

Request 240 comprises one or more requested write operations. The one or more write operations comprise operations to manipulate data stored in SDN 210, such as operations to create, update, or delete one or more of source data items 212-214. Processing the one or more requested write operations by SDN 210 comprises performing the one or more requested write operations and increasing current commit value 216. In embodiments where a current commit state, snapshot, or version of data is stored in data items 212-214, performing the requested one or more write operations can result in a new commit state, snapshot, or version of the data being stored in source data items 212-214. In these embodiments, the increased current commit value 216 identifies the new commit state, snapshot, or version of the data.

After processing request 240, SDN 210 is configured to transmit response 250 to database client 230. Response 250 comprises the increased current commit value 216. In embodiments where a current commit state, snapshot, or version of data is stored in data items 212-214, the increased current commit value in response 250 can identify the new commit state, version, or snapshot of the data now stored in SDN 210 as a result of the requested write operations.

SDN 210 is also configured to transmit replication messages (e.g. replication message 270) to RDNs, such as RDN 220. In some embodiments, SDN 210 can transmit replication messages asynchronously. For instance, in such embodiments, SDN 210 can transmit one or more replication messages while simultaneously processing one or more requests from database clients. Replication message 270 comprises a data manipulation log 272 and an associated commit value, such as increased current commit value 274. Data manipulation log 272 describes operations performed by SDN 210 to manipulate data stored in SDN 210, such as the operations to create, update, or delete one or more of source data items 212-214. In embodiments where a current commit state, snapshot, or version of data is stored in source data items 212-214, data manipulation log 272 can describe operations necessary to transform a previous commit state, snapshot, or version of the data into a new commit state, snapshot, or version of the data. In these embodiments, the commit value associated with data manipulation log 272, such as increased current commit value 274, identifies the new commit state, version, or snapshot of the data that will result after the operations described in data manipulation log 272 are performed on the previous commit state, version, or snapshot of the data.

RDN 220 comprises one or more replica data items (e.g. DR1 222-DRN 224) and an associated current commit value 226. One or more of replica data items 222-224 are replicas of one or more of source data items 212-214 stored in SDN 210. In some embodiments where source data items 212-214 store a commit state, version, or snapshot of data, replica data items 222-224 also store a commit state, version or snapshot of the data. In those embodiments, current commit value 226 identifies the particular commit state, version, or snapshot of data stored in replica data items 222-224.

RDN 220 is configured to receive and process queries (e.g. query 260) from database clients (e.g. database client 230). RDN 220 is also configured to receive and process replication messages (e.g. replication message 270) from SDNs (e.g. SDN 210). In some embodiments, RDN 220 is configured to receive and process replication message 270 asynchronously. For instance, in such embodiments RDN 220 can receive and/or process replication message 270 after receiving query 260 but before processing query 260, or alternatively while simultaneously processing query 260.

Query 260 comprises at least one request for data 262 and a last commit value 264. Process query 260 by RDN 210 comprises searching replica data items 212-214 for data that satisfies request for data 262 and returning data that satisfies the request for data 262 to database client 230. RDN 220 is further configured to process query 260 only if current commit value 226 is greater than or equal to last commit value 264. In some embodiments, RDN 220 delays processing query 260 if current commit value 226 is less than last commit value 264. In an alternative embodiment, RDN 220 rejects query 260 if current commit value 226 is less than last commit value 264.

Processing replication message 270 comprises replaying data manipulation log 272 at RDN 220 to update data stored in RDN 220 and setting current commit value 226 to the value of the commit value associated with data manipulation log 272, such as increased current commit value 274. RDN 220 is configured to update current commit value 226 only after data manipulation log 272 has been successfully replayed. In embodiments where data manipulation log 270 describes operations to transform a previous commit state, snapshot, or version of data into a new commit state, snapshot, or version of the data, RDN 220 is configured to replay the operations described in data manipulation log 272 to transform the commit state, version, or snapshot of the data stored in replica data items 222-224 into the new commit state, version or snapshot of the data. In these or further embodiments, RDN 220 updates current commit value 216 to indicate that the commit state, version, or snapshot of the data identified by the new value of current commit value 216 is now stored in replica database items 222-224.

In some scenarios, where request 240 is transmitted to SDN 210 and response 250 is received by database client 230 before database client 230 transmits query 260 to RDN 220, last commit value 264, that is part of query 260, is equal to increased current commit value received as part of response 250. In scenarios where query 260 is received by RDN 220 before RDN 220 processes replication message 270, replica data items 222-224 will not yet reflect the changes made by the one or more requested write operations that were performed on source data items 212-214. However, RDN 220 will not process query 260 because current commit value 226 will be less than last commit value 264, which is equal to increased commit value 216 in this scenario. After RDN 220 has received replication message 270 and has processed data manipulation log 272, RDN 220 is configured to update current commit value 226 to the commit value associated with data manipulation log 272, which in this scenario is increased commit value 274. In this scenario, current commit value 226 will now be greater than or equal to last commit value 264, so RDN 220 will now process query 260 if query 260 is still pending.

Figure 3:
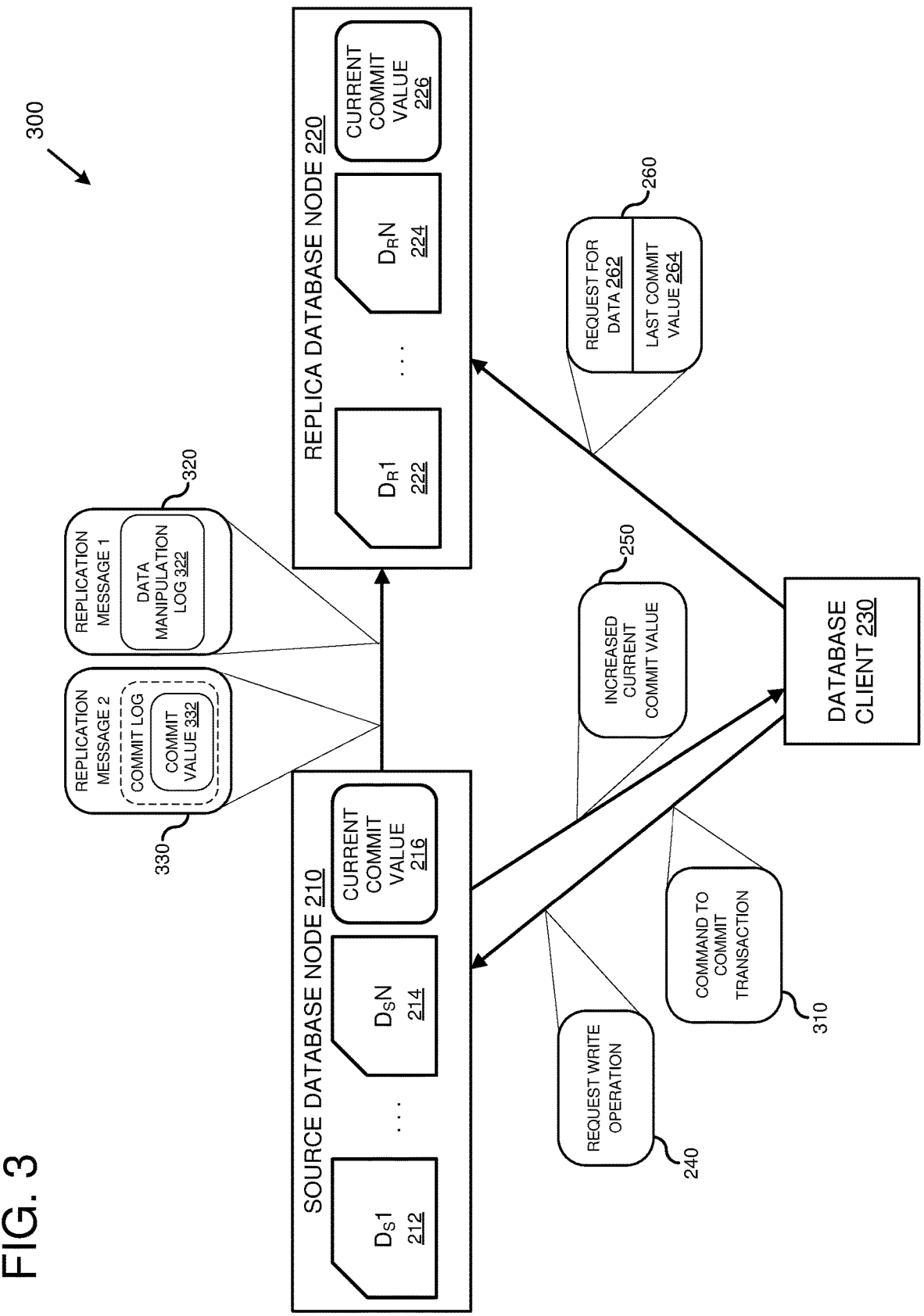
FIG. 3 is a diagram depicting another example system for ensuring snapshot monotonicity in asynchronous data replication, wherein multiple replication messages are transmitted from a source database node to a replica database node.

FIG. 3 is a diagram depicting another example system 300 for ensuring snapshot monotonicity in asynchronous data replication to RDNs (e.g. RDN 220). In system 300, a data manipulation log 322 and an associated commit value 332 are transmitted from SDN 210 to RDN 220 in separate replication messages. In example system 300, database client 230 is configured to send request 240 comprising one or more write operations to SDN 210 as part of a transaction. For instance, the transaction can be a database transaction that isolates the changes made to source data items 212-214 from other database clients until after database client 230 commits the transaction. In this example, database client 230 commits the transaction by sending a separate request 310 comprising a command to commit the transaction to SDN 210. In other embodiments, requested write operations and a command to commit the transaction can be transmitted as part of the same request.

In example system 300, current commit value 216 is not increased until the transaction associated with the requested write operations is committed. SDN 210 is configured to process the command to commit the transaction that is part of request 310. Processing the command to commit the transaction comprises committing the transaction, increasing current commit value 216, and transmitting response 250, comprising the increased current commit value, to database client 230.

In example system 300, RDN 220 is configured to receive replication messages 320-330. Replication message 320 comprises data manipulation log 322, which comprises a log of the one or more requested write operations. Upon receiving replication message 320, RDN 220 is configured to process data manipulation log 322 by manipulating the data stored in replica data items 222-224 so that replica data items 222-224 will be identical to source data items 212-214 after the one or more write operations were processed by SDN 210.

Replication message 330 comprises a commit value 332 that is associated with data manipulation log 322. After receiving replication message 330, and after data manipulation log 322 has been processed, RDN 220 is configured to update current commit value 226 to have the same value as commit value 332. In some embodiments, commit value 332 is part of a commit log that was generated by SDN 210 after processing the command to commit the transaction that is part of request 310. In different or further embodiments, commit value 332 is the same as the increased current commit value transmitted to database client 230 by SDN 210.

In some implementations, RDN 220 is configured to process data manipulation log 322 in isolation, so that changes made to replica data items 222-224 are not visible to database clients, such as database client 230, until after replication message 330 is received and commit value 332 is processed. In some embodiments, commit value 332 is part of a commit log that is transmitted as part of replication message 330.

Figure 4:
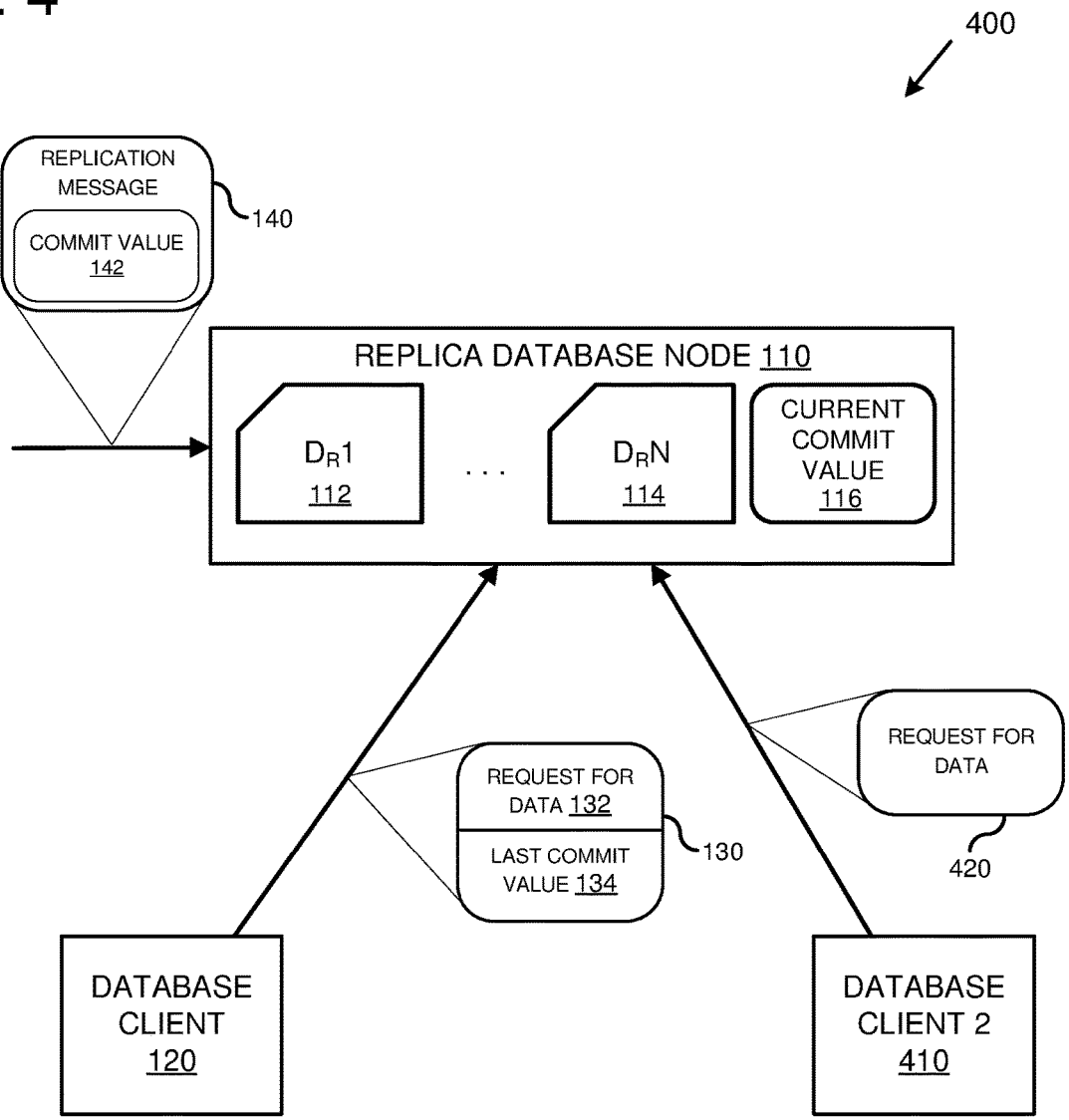
FIG. 4 is a diagram depicting another example system for ensuring snapshot monotonicity in asynchronous data replication, wherein requests for data are received from multiple database clients.

FIG. 4 is a diagram depicting another example system 400 for ensuring snapshot monotonicity in asynchronous data replication, wherein replica data base node 110 is configured to receive queries from multiple database clients (e.g. 120 and 410).

In example system 400, RDN 110 is configured to receive query 130 from database client 120 and to receive query 420 from database client 410. As discussed above, when referring to FIG. 1, query 130 comprises last commit value 134. Query 420 comprises a request for data, but does not comprise a commit value. After receiving query 420, RDN 110 is configured to determine whether or not database client 410 is logically associated with database client 120. If database client 420 is logically associated with database client 120, then RDN 110 is configured to process query 420 only after current commit value 116 is greater than or equal to last commit value 134, that was received from database client 120 as part of query 130.

In some embodiments, RDN 110 is configured to determine that database client 410 is logically associated with database client 120 by determining that database client 120 is associated with an active database session at RDN 110 and also determining that database client 410 is associated with the same active database session.

In some embodiments, query 130 is received by RDN 110, but its processing is delayed because current commit value 116 is less than last commit value 130. In some of these embodiments, if query 420 is received by RDN 110 while query 130 is pending, processing query 420 will be delayed until after query 130 is processed. In different or further embodiments, where processing replication message 140 increases current commit value 116 to a value greater than or equal to last commit value 134, processing query 420 will be delayed until after replication message 140 has been processed.

Figure 5:
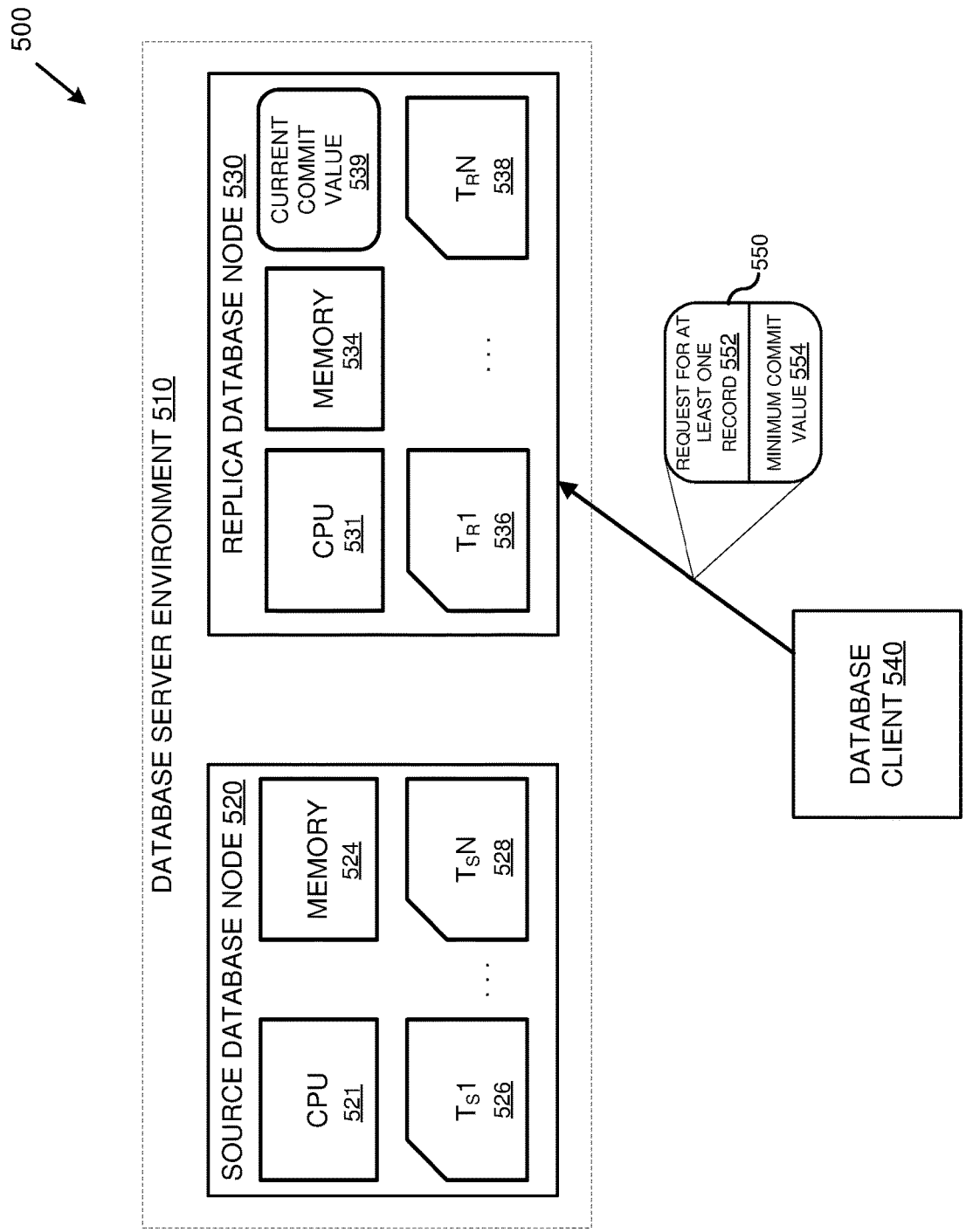
FIG. 5 is a diagram depicting an example system for ensuring snapshot monotonicity in asynchronous table replication.

Example 3—Database Server Environments for Ensuring Snapshot Monotonicity in Asynchronous Table Replication In any of the examples herein, a database server environment can be provided for performing operations for ensuring FIG. 5 is a diagram depicting an example system 500 for ensuring snapshot monotonicity in asynchronous table replication to RDNs (e.g. 530) in database server environment 510.

SDN 520 comprises processing unit 521 and memory 524, and SDN 520 stores one or more source database tables (e.g. 526-528). RDN 530 comprises processing unit 531 and memory 534, and RDN 530 stores one or more replica database tables 536-538. RDN 530 also comprises a current commit value 539.

In some embodiments, database nodes 520 and 530 are servers with independent hardware components. In such an embodiment, database nodes 520 and 530 can communicate with each other and with database client 540 via network connections, such as wired connections (e.g. Ethernet cables or fiber optic cables) or wireless connections (such as radio-based connections like Wi-Fi).

In some other embodiments, database nodes 520 and 530 are sockets in a non-uniform memory access (NUMA) architecture. In such an embodiment, database nodes 520 and 530 can communicate with database client 540 via network connections. Database nodes 520 and 530 can communicate with each other via network connections, direct access to remote memory (e.g., Intel® QuickPath Interconnect, AMD HyperTransport™, or the like), indirect access to remote memory (e.g., front-side bus, network interface, or the like), or any combination thereof.

Database nodes 520 and 530 can also be implemented as part of a uniform memory access (UMA) architecture or as virtual servers in a virtual server environment that supports hardware emulation.

A database table can be associated with one or more records. In some embodiments, database table records are referred to as documents, objects, entities, or the like. At least one of the one or more replica database tables 536-538 is a replica or copy of one of the source database tables 526-528.

RDN 530 is configured to perform operations to receive and process query 550, transmitted by database client 540. Query 550 comprises a request for at least one record in one of the one or more replica database tables 552 and a minimum commit value 554. After receiving query 550, RDN 530 is configured to perform operations to determine whether current commit value 539 is greater than or equal to minimum commit value 554. While current commit value 539 is not greater than or equal to minimum commit value 554, RDN 530 is configured to perform operations to delay processing of query 550. When current commit value 539 is greater than or equal to minimum commit value 554, RDN 530 is configured to perform operations to process query 550.

In some embodiments, processing query 550 comprises identifying at least one record in one or more of the replica database tables 536-538 to satisfy request 552. In further embodiments, the processing comprises transmitting the at least one identified record to database client 540 as part of a response to query 550. In some embodiments, request 552 identifies one or more requested records by providing a record identifier, for each requested record, that uniquely identified the record in a replica database table with which the record is associated. In such embodiments, RDN 530 is configured to identify each requested record by looking up the record in the associated table using the record identifier. In alternative or further embodiments, request 552 comprises search criteria, and the request is processed by identifying records in replica database tables 536-538 that match the search criteria. In some embodiments, the search criteria take the form of natural language, semantic, and/or Boolean expressions. In some embodiments, request 552 comprises one or more expressions in a formal syntax, such as SQL, Prolog, or the like.

In some embodiments, minimum commit value 554 represents a minimum commit value required to process any queries transmitted by database client 540. In an alternative embodiment, minimum commit value 554 represents a minimum commit value required only to process query 550.

Figure 6:
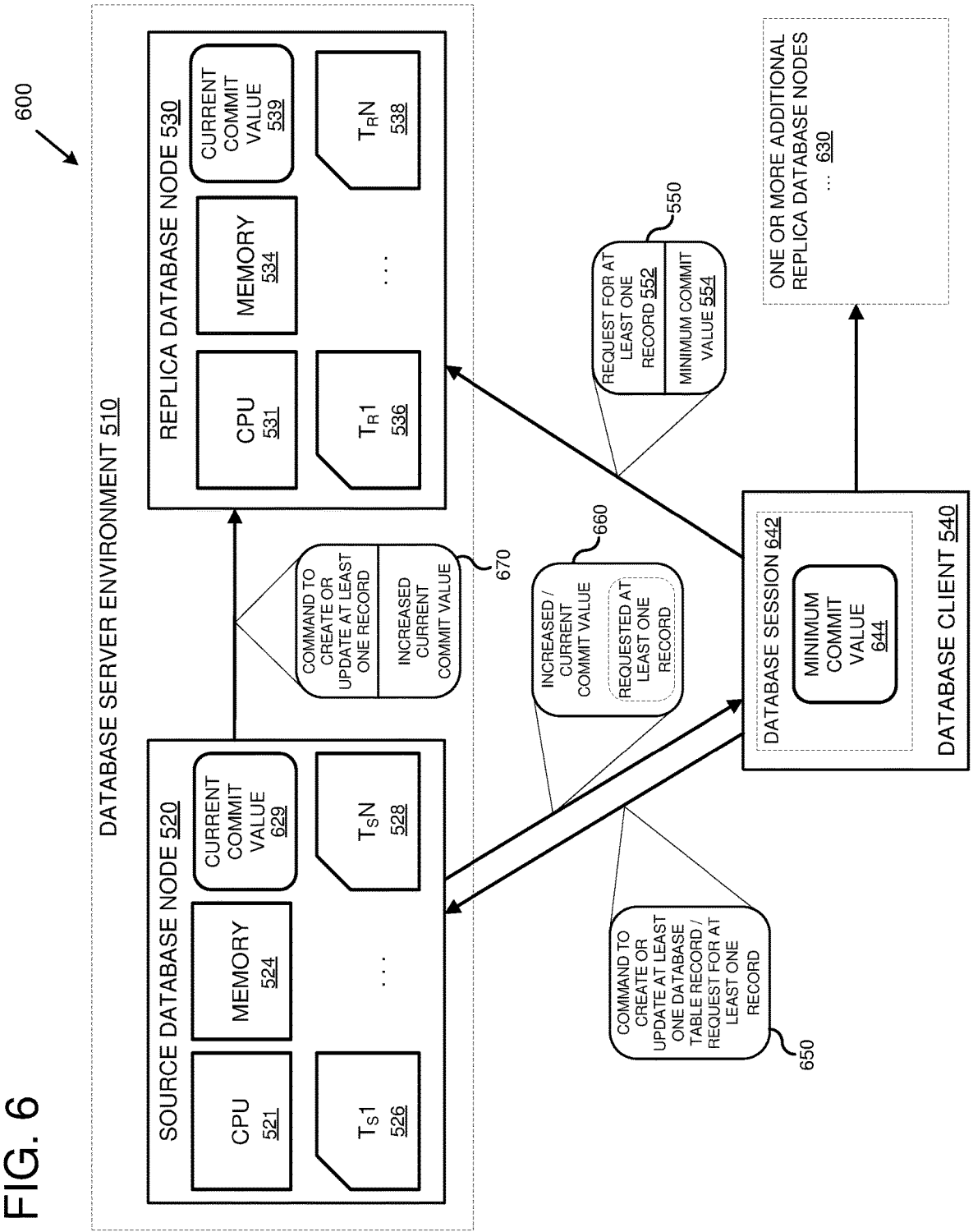
FIG. 6 is a diagram depicting another example system for ensuring snapshot monotonicity in asynchronous table replication.

FIG. 6 is a diagram depicting another example system 600 for ensuring snapshot monotonicity in asynchronous table replication to RDNs (e.g. 530) in database server environment 510.

In example system 600, RDN 530 is configured to perform operations to receive and process table replication messages (e.g. 670). In some embodiments, table replication messages are transmitted from one or more SDNs to RDN 530. For instance, replication message 670 is transmitted to RDN 530 from SDN 520. In some embodiments, RDN 530 is configured to perform operations to receive and process replication message 670 asynchronously. For instance, in such an embodiment RDN 530 could receive replication message 670 after receiving query 550 and could process replication message 670 before processing query 550 or, alternatively, at the same time that query 550 is being processed.

Table replication message 670 comprises at least one command to create or update at least one database table record and an increased current commit value. RDN 530 is configured to perform operations to process table replication message 670. Processing table replication message 670 comprises processing the at least one command to create or update at least one record in replica database tables 536-538 and setting current commit value 539 to the value of the increased current commit value. In some embodiments, RDN 530 only processes table replication message 670 if the increased current commit value is greater than current commit value 539. In such an embodiment, an increased commit value that is not greater than current commit value 539 can indicate that the at least one command has already been processed by RDN 530.

In example system 600, database client 540 is configured to transmit request 650 to SDN 520. SDN 520 is configured to perform operations to receive and process request 650. In some scenarios, request 650 comprises one or more commands to create or update at least one database table record. In the same or different scenarios, request 650 comprises a query or a request for at least one database table record.

If request 650 comprises one or more commands to create or update at least one database table record, SDN 520 is configured to process the one or more commands by creating or updating at least one record in one of the source database tables 526-528. After creating or updating the at least one record, SDN 520 is configured to increase current commit value 629.

In some embodiments, after processing request 650, SDN 520 is configured to asynchronously transmit the one or more commands and the increased value of current commit value 629 as part of table replication message 670. In other or further embodiments, SDN 520 is configured to store a current state, version, or snapshot of one or more database tables in source database tables 526-528. In such embodiments, current commit value 629 identifies the current commit state, snapshot, or version of the database tables stored in source database tables 526-528. Processing the one or more commands generates a new commit state, snapshot, or version of the database tables stored in source database tables 526-528, and the increased value of current commit value 629 identifies the new commit state, version, or snapshot.

In some of these embodiments, the one or more commands that are part of replication message 670 are commands that, when processed, will transform the previous commit state, version, or snapshot of the database tables into the new commit state, version, or snapshot of the database tables. In a scenario where the previous commit state, snapshot, or version of the database tables is stored in replica database tables 536-538, processing table replication message 670 transforms the previous commit state, snapshot, or version of the database tables is stored in replica database tables 536-538 into the new commit state, snapshot, or version of the database tables and sets current commit value 539 to the increased current commit value that identifies the new commit state, version, or snapshot.

If request 650 comprises a query or a request for at least one database table record, SDN 520 is configured to perform operations to identify the at least one record in source database tables 526-528. In some embodiments, request 650 comprises a record identifier for each requested record that uniquely identifies the record in a source database table with which the record is associated. In such embodiments, SDN 520 is configured to identify each requested record by looking up the record in the associated table using the record identifier. In alternative or further embodiments, request 650 comprises search criteria and the request is processed by identifying records in source database tables 526-528 that match the search criteria.

After processing request 650, SDN 520 is configured to perform operations to transmit response 660 to database client 540. If request 650 comprised one or more commands to create or update at least one database table record, then response 660 will comprise the increased value of current commit value 629. If request 650 comprised a query or a request for at least one database table record, then response 660 will comprise the current value of current commit value 629 and the requested at least one record, if it was found in any of source database tables 526-528.

In example system 600, database client 540 comprises minimum commit value 644. After receiving response 660, database client 540 is configured to update minimum commit value 644 to the value of the increased or current commit value that is part of response 660. Database client 540 is also configured to transmit minimum commit value 644 as minimum commit value 544 as part of query 550.

In at least one scenario, database client 540 transmits request 650 to SDN 520. SDN 520 then processes request 650 and transmits the value of current commit value 629 to database client 540 as part of response 660. Upon receiving response 660, database client 540 updates minimum commit value 644 to the commit value that is part of response 660. Database client 540 then transmits query 550 to RDN 530, comprising minimum commit value 644 as minimum commit value 554. Upon receiving query 550, RDN 530 compares minimum commit value 554 to current commit value

539. If current commit value 539 is less than minimum commit value 554, then RDN 530 delays processing query 550. At some point, RDN 530 asynchronously receives table replication message 670 from SDN 520, comprising a commit value that is greater than or equal to minimum commit value 554. RDN 530 then processes table replication message 670 and sets current commit value 539 to the commit value that is part of replication message 670. Now that current commit value 539 is greater than or equal to minimum commit value 554, RDN processes query 550.

In some embodiments, minimum commit value 644 is associated with database session 642. Database session 642 can be associated with communications between database client 540 and one or more database nodes. For instance, in one scenario, database session 642 is associated with request 650, response 660, and request 550. In some embodiments, database client 540 can have more than one database session. In such scenarios, each database session may be associated with a different commit value and/or communications with different database nodes.

In some embodiments, database server environment 510 comprises one or more additional RDNs (e.g. 630). An additional RDN can comprise an additional processing unit, an additional memory, and one or more additional replica database tables. In some embodiments, the one or more additional replica database tables are replicas of source database tables 526-528. In some of these embodiments, one or more of the additional replica database tables and one or more of replica database tables 536-538 may be replicas of the same one or more of source database tables 526-538. Each additional RDN can be configured to receive and process queries from database clients (e.g. 540), and to compare a minimum commit value required to process each query with a current commit value of the additional RDN. Each additional RDN can also be configured to receive table replication messages from one or more SDNs (e.g. 520).

In at least one scenario, after transmitting query 550 to RDN 530, database client 540 transmits a second query comprising a request for at least one record in a replica database table stored in the second RDN, and minimum commit value 554, to a second RDN. The second RDN is configured to receive and process the second query. The second RDN determines that minimum commit value 554 is greater than a current commit value associated with the second RDN and delays processing the second query. The second RDN then asynchronously receives table replication message 670 from SDN 520. The second RDN processes table replication message 670 by updating at least one record in one of the replica database tables stored in the second RDN and setting the second RDN's current commit value to the value of increased commit value that is part of table replication message 670. After updating the current commit value, it is greater than or equal to minimum commit value 554. The second RDN then processes the second query only after its current commit value is greater than or equal to minimum commit value 554.

Example 4—Methods for Ensuring Snapshot Monotonicity in Asynchronous Data Replication In any of the examples herein, methods can be provided for ensuring snapshot monotonicity.

Figure 7:
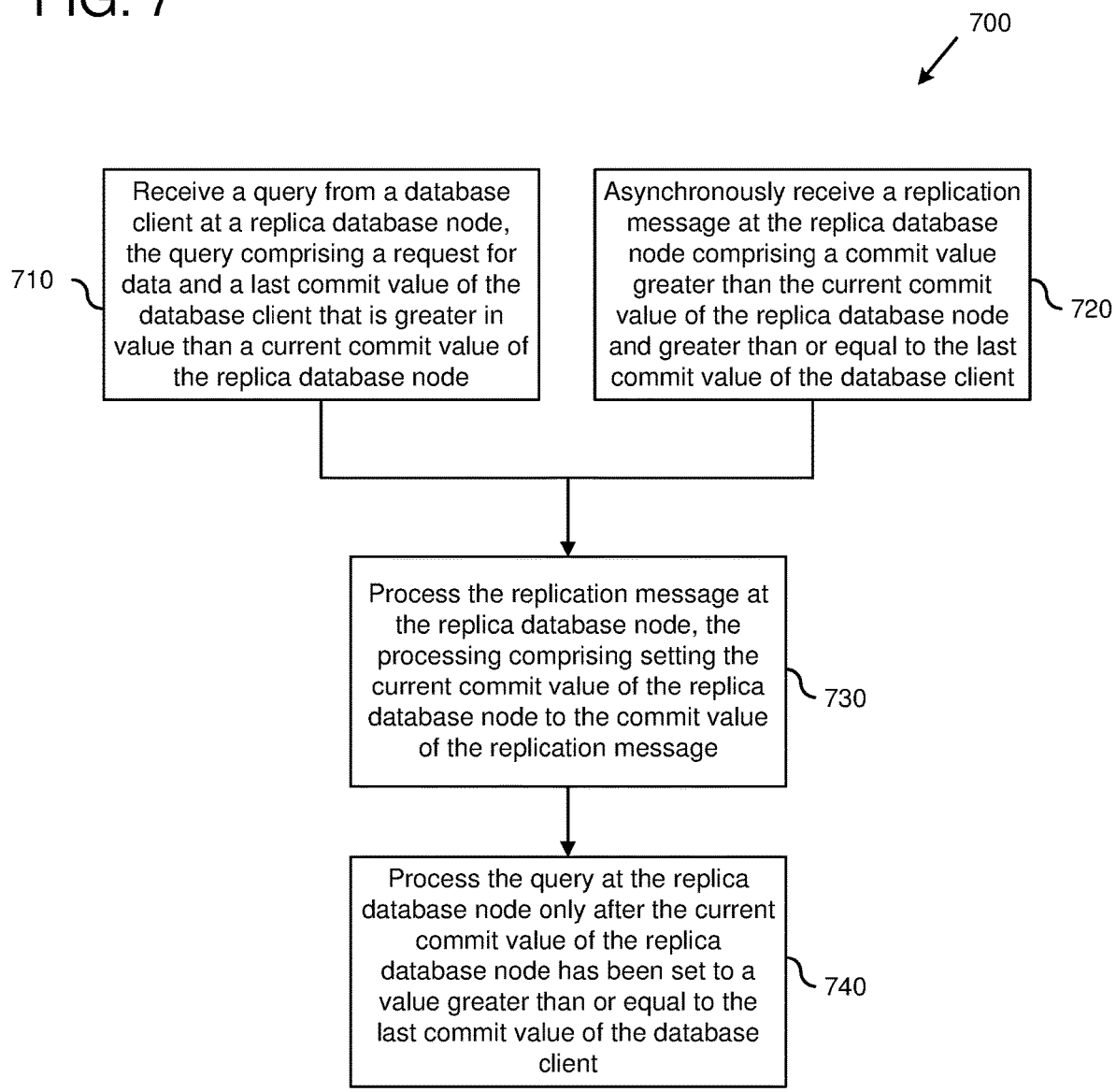
FIG. 7 is a flowchart depicting an example method for ensuring snapshot monotonicity in asynchronous data replication.

FIG. 7 is a flowchart depicting an example method 700 for ensuring snapshot monotonicity in asynchronous data replication. At 710, a query is received at a replica database node (RDN) from a data base client. The query comprises a request for data and a last commit value associated with the request for data. In this example, the last commit value is greater in value than a current commit value of the RDN.

At 720, the RDN asynchronously receives a replication message comprising a commit value that is greater than the current commit value of the RDN and that is greater than or equal to the last commit value of the database client. At 730 the replication message is processed at the RDN. The processing comprises setting the RDN's current commit value to the commit value of the replication message.

At 740, the query is processed at the RDN only after the current commit value of the RDN has been set to a value greater than or equal to the last commit value of the database client.

Figure 8:
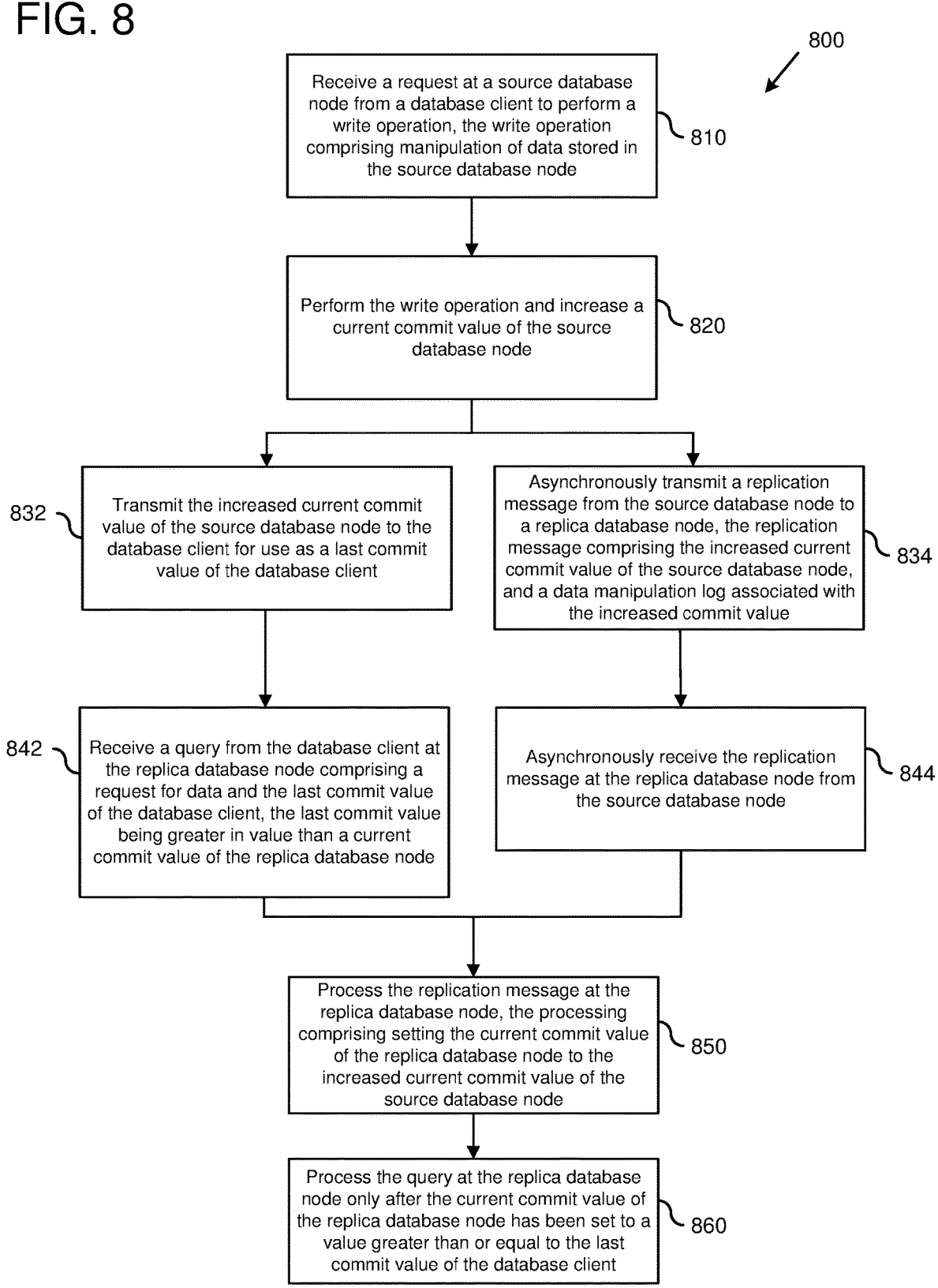
FIG. 8 is a flowchart depicting another example method for ensuring snapshot monotonicity in asynchronous data replication, wherein a replication message is transmitted to a replica database node from a source database node.

FIG. 8 is a flowchart depicting another example method 800 for ensuring snapshot monotonicity in asynchronous data replication from a source database node (SDN) to a RDN. At 810, a request from a database client to perform a write operation is received at a SDN. The write operation comprises manipulation of data stored in the SDN. For instance, the data stored in the SDN may be one or more source data items, one or more source database tables, or the like.

At 820, the SDN performs the requested write operation. After performing the write operation, the SDN increases a current commit value of the SDN. At 832, the SDN transmits the increased current commit value to the database client. The database client then uses it as a last commit value that is transmits as part of subsequent requests. In some embodiments, a commit value signifies a commit state, version, or snapshot of the data stored in a database node. In such an embodiment, a database node must contain the commit state, version, or snapshot signified by the database client's last commit value, or a more recent state, version or snapshot of the data in order to process requests from the database client.

At 834, the SDN asynchronously transmits a replication message to a RDN. The replication message comprises the increased current commit value of the SDN and a data manipulation log associated with the increased current commit value. In an embodiment where a commit value signifies a commit state, version, or snapshot of the data stored in a database node, the increased current commit value signifies a commit state, version, or snapshot that will result after the RDN performs operations described in the data manipulation log on data stored in the RDN.

At 842, the RDN receives a query from the database client. The query comprises a request for data stored in the RDN and the last commit value of the database client. The RDN determines that the last commit value of the database client is greater in value than a current commit value of the RDN. In embodiments where a commit value signifies a commit state, version, or snapshot of data, the fact that the last commit value of the database client is greater in value than the current commit value of the RDN indicates that the commit state, snapshot, or version of data stored in the RDN is not current enough to correctly process the query from the database client. For instance, in this example, the database client's last commit value can signify the commit state, version, or snapshot of data that is now stored in the SDN after the requested write operation was performed. Since the commit state, version, or snapshot of data stored in the RDN does not reflect these changes, the RDN cannot correctly process the database client's query.

At 844, the RDN asynchronously receives the replication message from the SDN. At 850, the RDN processes the replication message. Processing the replication message comprises processing the data manipulation log and setting the RDN's current commit value to the increased commit value, which is the current commit value of the SDN. In embodiments where a commit value signifies a commit state, version, or snapshot of data, processing the data manipulation log comprises performing operations described in the log to transform the commit state, version, or snapshot of data currently stored in the RDN into the new commit state, version, or snapshot signified by the increased current commit value. In such embodiments, setting the RDN's current commit value to the increased current commit value signifies that the new commit state, version, or snapshot of the data is now stored in the RDN.

At 860, the RDN processes the query from the database client only after the current commit value of the RDN has been set to a value greater than or equal to the last commit value of the database client. For instance, in this example the current commit value of the RDN will be greater than or equal to the database client's last commit value after the RDN processes the replication message from the SDN. Therefore, the RDN will process the query only after the data stored in the RDN embodies the changes made by the requested write operation to the data stored in the SDN.

Figure 9:
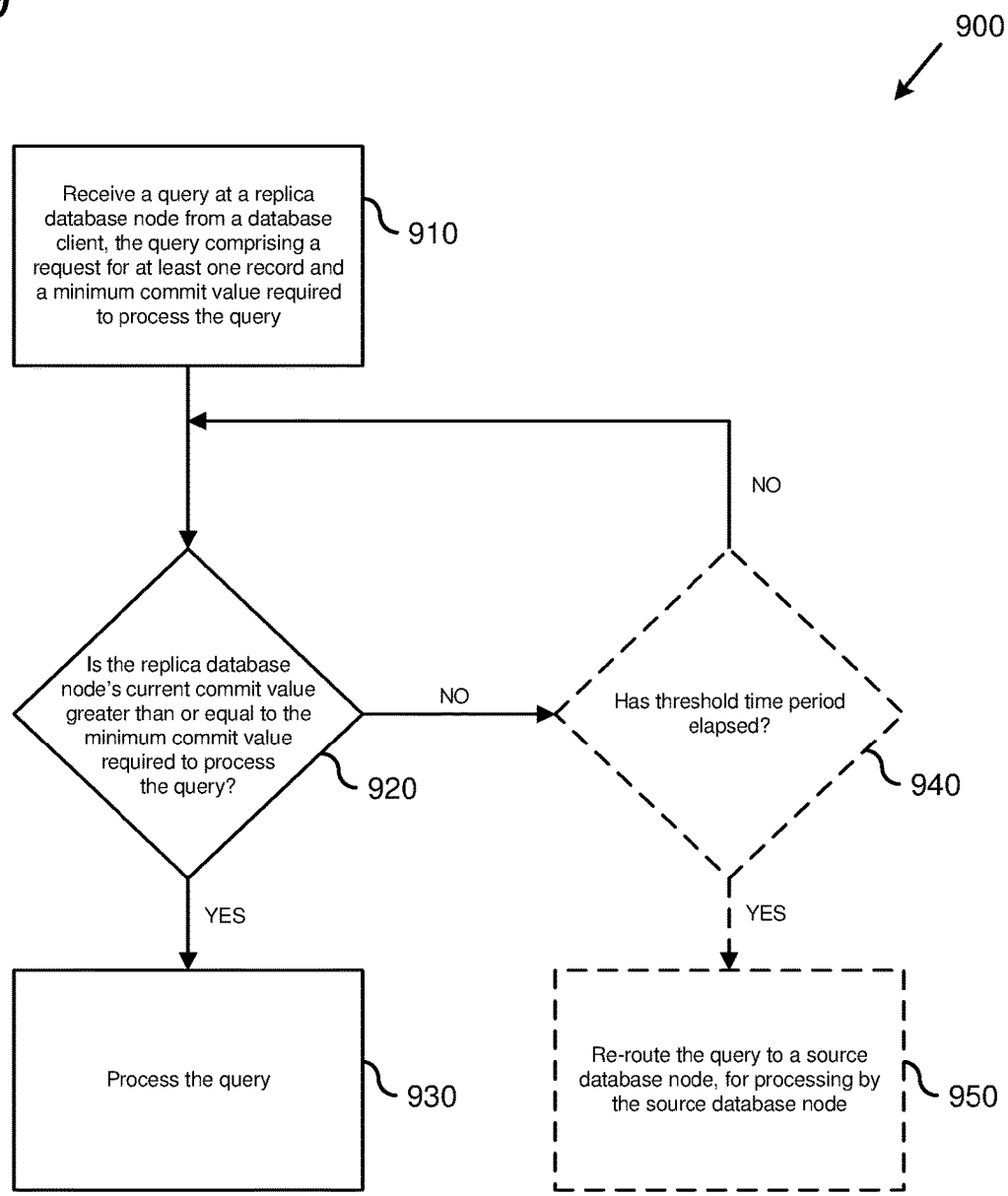
FIG. 9 is a flowchart depicting another example method for ensuring snapshot monotonicity in asynchronous data replication, wherein a query can be optionally rerouted to another database node.

FIG. 9 is a flowchart depicting another example method 900 for ensuring snapshot monotonicity in asynchronous data replication, wherein a query can be optionally rerouted to another database node. At 910, a replica database node (RDN) receives a query from a database client. The query comprises a request for at least one database table record and a minimum commit value required to process the query. In some embodiments, the minimum commit value required to process the query is a last commit value associated with the database client.

At 920, the RDN determines whether or not its current commit value is greater than or equal to the minimum commit value required to process the query. If the RDN's current commit value is greater than or equal to the minimum commit value, then at 930 the RDN processes the query. If the RDN's current commit value is not greater than or equal to the minimum commit value, then the RDN delays processing the query.

Optionally, at 940 the RDN determines if a threshold time period has elapsed after receiving the query from the database client. If the threshold time period has not elapsed, then the RDN continues to delay processing the query. If the threshold time period has elapsed, then at 950 the query is re-routed to a source database node (SDN), for processing by the SDN. In this way, processing the database client's query may not be delayed for an unduly long amount of time. If the RDN's current commit value is not increased to a value greater than or equal to the minimum commit value within the threshold time period, then the query is re-routed to the SDN where it can be processed.

In an alternative embodiment, the query is re-routed to a second RDN at 950 instead of a SDN, for processing by the second RDN. In such an embodiment, the second RDN has a current commit value that is greater than or equal to the minimum commit value required to process the query and, therefore, is able to process the query after receiving it.

Figure 10:
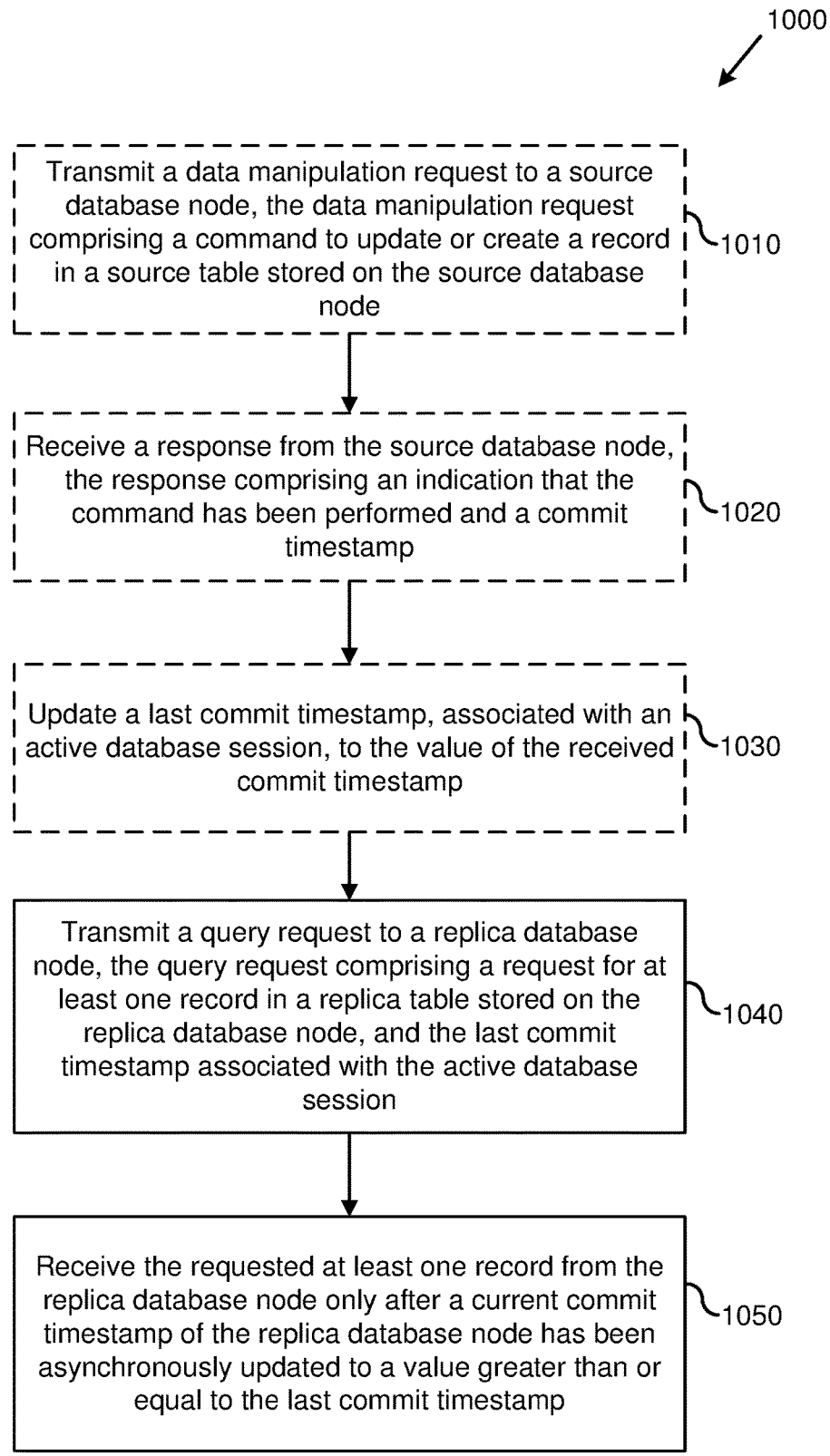
FIG. 10 is a flowchart depicting another example method for ensuring snapshot monotonicity in asynchronous table replication that makes use of a last commit timestamp stored in association with an active database session.

FIG. 10 is a flowchart depicting another example method 1000 for ensuring snapshot monotonicity. At 1040, a query request is transmitted to a replica database node (RDN). The query request comprises a request for at least one record in a replica database table stored on the RDN, and a last commit timestamp associated with an active database session. In some embodiments, the active database session comprises active connections to one or more database nodes. In different or further embodiments, the active database session is associated with a particular commit state, version, or snapshot of data that provides a consistent view of the data to the active database session that is isolated from operations performed by other database sessions. In such an embodiment, the last commit timestamp identifies the commit state, version, or snapshot of the data associated with the active database session. The last commit timestamp is transmitted as part of the query request in order to signify that the RDN must have the identified commit state, version or snapshot, or a newer commit state, version, or snapshot of the data before processing the query request in order to ensure that the active database session maintains a consistent view of the data.

At 1050, the requested at least one record is received from the RDN only after a current commit timestamp of the RDN has been asynchronously updated to a value greater than or equal to the last commit value. If the current commit timestamp of the RDN was greater than or equal to the last commit timestamp when the query request was received, then the RDN will process the query request. However, if the current commit timestamp was not greater than or equal to the last commit timestamp when the query request was received then, the RDN may delay processing the query request until the data stored in the RDN is asynchronously updated to the commit state, snapshot, or version of the data identified by the last commit timestamp, or a newer commit state, version, or snapshot of the data.

At 1010-1030, a data manipulation request is optionally transmitted to a source database node (SDN) before the query request is transmitted to the RDN. At 1010, a data manipulation request comprising a command to update or create a record in a source table stored on a SDN is transmitted to the SDN. At 1020, a response is received from the SDN comprising an indication that the command to update or create a record in a source table has been performed, and a commit timestamp. At 1030, the last commit timestamp associated with the active database session is updated to the value of the commit timestamp received as part of the response.

In some embodiments, when the data manipulation request is transmitted to the SDN at 1010-1030, then at 1050 the requested at least one record is received from the RDN only after the command to update or create a record in the source tables stored on the SDN has been asynchronously replayed on the RDN. In such an embodiment, asynchronously replaying the command comprises updating the current commit timestamp of the RDN to the value of the commit timestamp that was transmitted as part of the response by the SDN. Since the last commit timestamp associated with the active database session was updated to the value of the commit timestamp transmitted as part of the response by the SDN, the RDN's current commit timestamp will have a value greater than or equal to the last commit timestamp after the command has been replayed.

Example 5—Computing Systems

Figure 11:
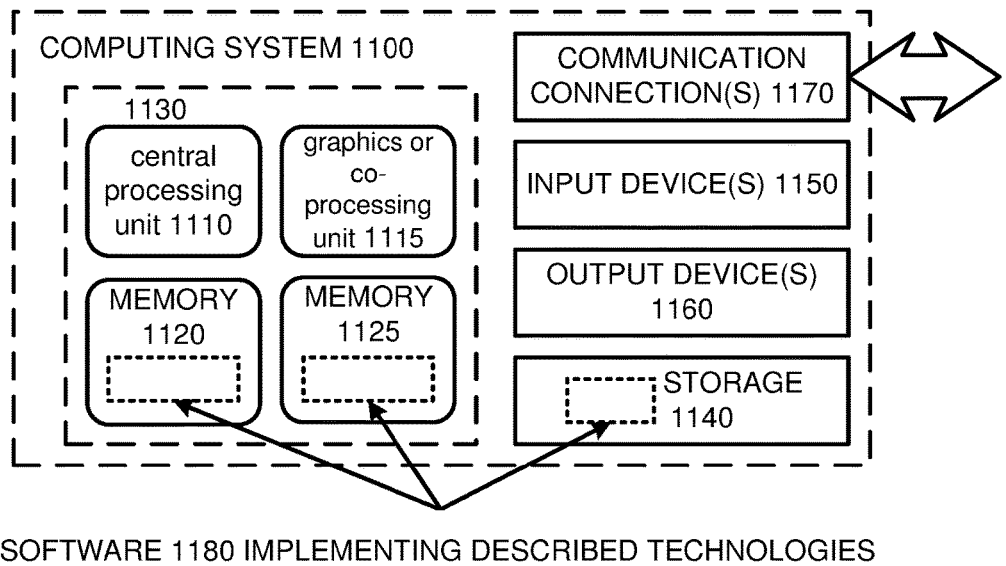
FIG. 11 is a diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. For video encoding, the input device(s) 1150 may be a camera, video card, TV tuner card, or similar device that accepts video input in analog or digital form, or a CD-ROM or CD-RW that reads video samples into the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 6—Cloud Computing Environment

Figure 12:
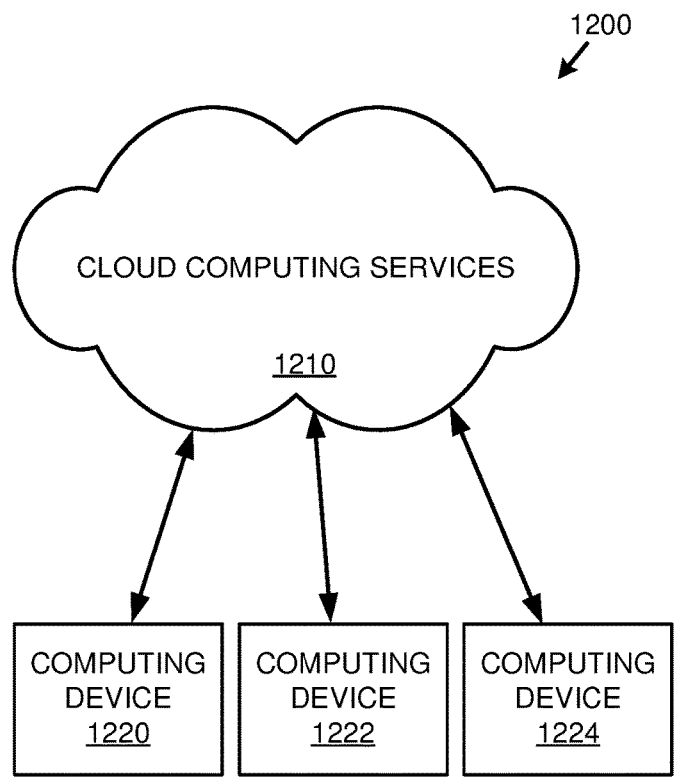
FIG. 12 is an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operators (e.g., data processing, data storage, and the like).

Example 7—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented by at least one computing device, the method comprising:
   receiving a query at a replica database node (RDN) from a client, the query comprising:
   a request for data stored in the RDN, and
   a last database commit value of the client that is greater than a current database commit value of the RDN;
   processing a replication message at the RDN, the processing comprising setting a current database commit value of the RDN to a database commit value of the replication message; and
   processing the query at the RDN only after the current database commit value of the RDN has been set to a value that is greater than or equal to the last database commit value of the client.

2. The method of claim 1, further comprising:
   receiving the replication message from a source database node (SDN), wherein the replication message further comprises a data manipulation log associated with the database commit value of the replication message;
   replaying the data manipulation log to update data stored in the RDN; and
   setting the current database commit value of the RDN to the database commit value of the replication message only after replaying the data manipulation log.

3. The method of claim 2, wherein the database commit value associated with the data manipulation log is part of a separate commit log that is received at the RDN as part of a second replication message.

4. The method of claim 2, further comprising:
   receiving a request at the SDN from the client to perform a write operation;
   performing the write operation and increasing a current database commit value of the SDN; and
   transmitting the increased current database commit value of the SDN to the client for use as the last database commit value of the client.

5. The method of claim 4, further comprising:
   transmitting the write operation as part of the data manipulation log, and the increased current database commit value of the SDN as the commit value associated with the data manipulation log, in the replication message from the SDN to the RDN.

6. The method of claim 4, wherein:
   the request to perform the write operation and the query received from the client are part of a database session of the client; and
   the last database commit value of the client is associated with the database session.

7. The method of claim 1, further comprising:
   re-routing the query from the RDN to a SDN, for processing by the SDN, if the current database commit value of the RDN is not increased to a value greater than or equal to the last database commit value of the database client within a threshold time period after receiving the query at the RDN.

8. The method of claim 1, wherein:
   the client is a first client; and
   the method further comprises:
   receiving a second query at the RDN from a second client, wherein the second query does not contain a database commit value;
   determining that the second client is logically associated with the first client; and
   processing the second query only after the current database commit value of the RDN is greater than or equal to the last database commit value of the first client.

9. The method of claim 8, wherein the determining that the second client is logically associated with the first client comprises:
   determining that the first client is associated with an active database session at the RDN; and determining that the second client is associated with the active database session at the RDN.

10. The method of claim 1, wherein the last database commit value of the query, the current database commit value of the RDN, and the database commit value of the replication message are timestamps.

11. The method of claim 1, further comprising:
re-routing the query from the RDN to a second RDN, for processing by the second RDN, if the current database commit value of the RDN is not increased to a value greater than or equal to the last database commit value of the client within a threshold time period after receiving the query at the RDN, and a current database commit value of the second RDN is greater than or equal to the last database commit value of the client.

12. A system, comprising:
a replica database node (RDN) comprising a processor and a memory, the RDN storing one or more replica database tables that are replicas of source tables stored in a source database node (SDN) and a current database commit value of the RDN, wherein the RDN is configured to perform operations using the processor, the operations comprising:
receiving a query at the RDN from a client, the query comprising:
a request for at least one record in one of the one or more replica database tables, and
a minimum database commit value required to process the query;
delaying processing the query while the current database commit value of the RDN is not greater than or equal to the minimum database commit value required to process the query; and
processing the query when the current database commit value of the RDN is greater than or equal to the minimum database commit value required to process the query.

13. The system of claim 12, wherein the operations further comprise:
receiving a table replication message at the RDN, the table replication message comprising a replication of a command to create or update at least one database table record and an increased current database commit value that is greater than or equal to the minimum database commit value required to process the query; and
setting the current database commit value of the RDN to the increased current database commit value.

14. The system of claim 13, wherein:
the query is a first query; and
the system further comprises a second RDN comprising a second processor and a second memory, the second RDN storing a second one or more replica database tables that are replicas of the source tables stored in the SDN and a second current database commit value, wherein the second RDN is configured to perform operations using the second processor, the operations comprising:
receiving a second query at the second RDN from the client, the second query comprising a request for at least one record in one of the second one or more replica database tables and a minimum database commit value required to process the second query, wherein the minimum database commit value required to process the second query is the same as the minimum database commit value required to process the first query,
determining that the minimum database commit value required to process the second query is greater than the current database commit value of the second RDN,
receiving the table replication message at the second RDN,
setting the current database commit value of the second RDN to the increased current database commit value, and
processing the second query only after the current database commit value of the second RDN is greater than or equal to the minimum database commit value required to process the second query.

15. The system of claim 13, wherein the table replication message is transmitted from the SDN to the RDN.

16. The system of claim 12, further comprising:
the SDN, wherein the SDN comprises a second processor and a second memory, the SDN storing one or more source database tables and a current database commit value, wherein the SDN is configured to perform operations using the second processor, the operations comprising:
receiving a request at the SDN from the client, the request comprising a command to create or update at least one database table record;
creating or updating at least one record in one of the source database tables;
increasing a current database commit value of the SDN; and
transmitting a response to the client comprising the increased current database commit value.

17. The system of claim 12, wherein the operations further comprise:
determining that processing the query has been delayed for a period of time exceeding a threshold time period; and
re-routing the query to the SDN for processing by the SDN.

18. One or more computer-readable storage media storing computer-executable instructions that, when executed by a processor of a computing device, cause the computing device to perform operations for ensuring snapshot monotonicity in asynchronous table replication across multiple database nodes, the operations comprising:
transmitting a query request to a replica database node (RDN), the query request comprising:
a request for at least one record in a replica table stored on the RDN, and
a last database commit value; and
receiving the requested at least one record from the RDN only after a current database commit value of the RDN has been updated to a value greater than or equal to the last database commit value.

19. The one or more computer-readable storage media of claim 18, wherein the operations further comprise:
transmitting a data manipulation request to a source database node (SDN), the data manipulation request comprising a command to update or create a record in a source table stored on the SDN;
receiving a response from the SDN, the response comprising an indication that the command has been performed, and a database commit value;
setting the last database commit value equal to the database commit value received in the response; and
receiving the requested at least one record from the RDN only after the command to update or create the record in the source table stored on the SDN has been replayed on the RDN and the current database commit value of the RDN has been updated to a value greater than or equal to the last database commit value.

20. The one or more computer-readable storage media of claim 18, wherein the operations further comprise:
transmitting another query request to a source database node (SDN) before transmitting the query request to the RDN, the other query request comprising a request for at least one record in a source table stored on the SDN;
receiving a response from the SDN, the response comprising:
the at least one record, and
a current database commit value of the SDN;
setting the last database commit value equal to the current database commit value of the SDN; and
transmitting the last database commit value as the last database commit value that is part of the query request transmitted to the RDN.

* * * * *